(12) United States Patent
Ogasawara

(10) Patent No.: US 6,735,761 B1
(45) Date of Patent: May 11, 2004

(54) COMPILE METHOD FRAME DETECTION METHOD AND DEVICE CODE DISCARDING METHOD AND COMPUTER

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,923

(22) Filed: Jun. 30, 1999

(30) Foreign Application Priority Data

May 15, 1998 (JP) .......................................... 10-132918

(51) Int. Cl.⁷ ............................................... G06F 9/45
(52) U.S. Cl. ...................................... 717/140; 717/151
(58) Field of Search ................................ 717/139, 140, 717/148, 136–153; 707/206; 711/133–136

(56) References Cited

U.S. PATENT DOCUMENTS

| | | | | |
|---|---|---|---|---|
| 5,987,256 A | * | 11/1999 | Wu et al. .................... | 717/108 |
| 6,006,235 A | * | 12/1999 | Macdonald et al. ........ | 707/103 |
| 6,047,125 A | * | 4/2000 | Agesen et al. .............. | 717/151 |

FOREIGN PATENT DOCUMENTS

| | | | | |
|---|---|---|---|---|
| JP | 2267629 | 11/1990 | ........... | G06F/59/44 |

OTHER PUBLICATIONS

Huelsbergen et al. Very Concurrent Mark–&–Sweep Garbage Collection without Fine–Grain Synchronization. ACM. 1998. pp. 166–175.*

Horspool et al. Static Analysis of PostScript Code. IEEE. 1992. pp. 14–23.*

Evans et al. Garbage Collection and Memory Management. pp. 138–143. 1997.6047125.*

Benjamin Zorn, "The Measured Cost of Conservative Garbage Collection", Apr. 1992, Technical Report CU–CS–573–92, Software Practice & Experience, vol. 23 (7) 733–756.

H. Boehm et al., "Garbage Collection in an Uncooperative Environment", Software Practice and Experience, vol. 18(9), 807–820 (Sep. 1988).

Hans–Juergen Boehm, "Space Efficient Conservative Garbage Collection", Xerox PARC, boehm#parc.xerox.com, pp. 197–206.

Cramer et al, Compiling Java Just in Time, May/Jun. 1997 IEEE Micro, pp. 36–43.

* cited by examiner

*Primary Examiner*—Wei Y. Zhen
(74) *Attorney, Agent, or Firm*—Owen J. Gamon; Grant A. Johnson

(57) ABSTRACT

To detect only JITed frames which are frames for codes compiled by a Java Just In Time compiler (JIT compiler) in an environment in which the memory available for use by a Java JIT compiler is limited, and JITed frames and other frames coexist in a thread stack. When the JIT compiler causes short of memory in a specific thread, all the threads are temporarily suspended. Then, each thread is searched for active methods, i.e., in each thread stack JITed code addresses are searched for. When there is no JITed last frame records, each frame is scanned from the position pointed by the current stack pointer SP to the bottom of the stack. When there is a list, it is scanned from the position pointed by the current stack pointer SP to the address of a JITed frame pointed by the latest JITed last frame record in the list. Following this, a frame pointed by a JITed last frame record and a JITed frame that can be traced from the pointed frame are detected. In FIG. 6, a stack area above the JITed frame of JITed code E (an area from the SP to a frame with the label E) is a frame of non-JITed code called from a point at which it is determined that a JITed last frame record will not be formed, or a frame of an exception handler that handles a Java exception mapped to a CPU exception.

18 Claims, 7 Drawing Sheets

COMPILE METHOD FRAME DETECTION METHOD AND DEVICE CODE DISCARDING METHOD AND COMPUTER

FIELD OF THE INVENTION

The present invention relates to a compiler, and more particularly to a Java (Trademark of Sun Microsystems Corp.) JIT (Just In Time) compiler.

BACKGROUND ART

Currently, Java is positioned for use not only as a common language of network computing, but also as a standard, object-oriented and platform-independent language. A program written in Java is compiled to produce a program in bytecode that can be executed by a Java virtual machine. This affords to a program written in Java the advantage that it can be run by any computer that supports Java, regardless of the CPU employed (multi-platform capability).

However, the execution of the bytecode by the virtual machine provides a performance that is inferior to that provided by the direct execution of a code that is written in a machine language. In general, therefore, while a Java program is executed, a JIT compiler converts the bytecode into a machine language code (a code that is hereinafter referred to as a JITed code), and the JITed code is executed instead of the bytecode. The minimum unit for the compile is a sub-routine called a method. By converting into the machine language code a code which is frequently executed, the performance characteristics of the machine language code are exhibited, while at the same time the multi-platform characteristic of the Java bytecode is retained.

Since the JITed code of the method is adequate for a CPU that executes a program, it is the equivalent of the optimal code generated by a C compiler, for instance. In a CPU that currently be in use, when a sub routine is called, in a stack, the sub-routine forms an area, which is called a frame, for the storage of local variables that are used by the sub-routine. FIG. 1 shows a stack after a sub-routine A has called a sub-routine B and the sub-routine B has called a sub-routine C. The stack has been extended upward, the individual areas constituting the frames of the sub-routines, while a stack pointer SP points to the topmost address in frame C. When the sub-routine C then calls a sub-routine D, a frame of the sub-routine D is formed on the current position pointed by the stack pointer SP. The stack pointer SP points to the topmost address in the newly formed frame. When returning from a certain sub-routine to the previous sub-routine, the frame for the certain sub-routine is removed. Thus, when returning form the sub-routine D to the sub-routine C, the frame of the sub-routine D is removed before the returning, and the address pointed by the stack pointer SP is returned to the one pointed at when the sub-routine C called the sub-routine D. In Java, a CPU resource is assigned for each unit execution, called a thread, and for each thread there is an inherent stack called a thread stack. The JITed code forms the previously mentioned frame (hereinafter referred to as a JITed frame) in the thread stack.

JITed frames are not the only ones found in the thread stack. JITed code may call a variety of service routines that a Java virtual machine provides, and some service routines may activate other, new Java virtual machines. FIG. 2 shows the state where frames of JITed code and frames of codes other that JITed code coexist in a thread stack. The frames identified by alphabetical characters are JITed frames.

The use of memory by a JIT compiler will now be explained. A JIT compiler uses memory for the storage of JITed code or for a compiling work area. However, the memory that is available is not infinite. In particular, a computer having no hard disk has no virtual memory by the secondary storage; such a computer has only real memory, and memory having only a limited capacity can be provided for the use of a JIT compiler. The use of such computers that have only real storage has spread because of the introduction of an NC (Network Computing) machine. The NC machine was proposed as a countermeasure to provide a reduction in the operating costs associated with the client management side in a server-client environment. Since application programs can be downloaded from the server, one of these computers has no need for a hard disk, and is available at a low price.

When only a limited amount of memory is available for a JIT compiler, while such a JIT compiler is in use a shortage of memory may occur. In such a case, one of three countermeasures can be selected: (1) the JIT compiler does not compile the pertinent method; (2) the optimization level of the JIT compiler is reduced and the JIT compiler switches its mode into one that uses less memory; or (3) the JIT compiler gets new free memory space. In this invention, (3) is employed. To get free memory, a part or all of the JITed codes which have already existed and which can be discarded is discarded to release areas in which the discarded JITed code previously occupied. This is a concept that was already known at the time the SmallTalk system was developed, but no method has been provided that can be applied for a frame optimized-by a JIT compiler that is as good as the one available for the C language.

Only JITed code is discarded, and the discarding process is called JIT code garbage collection (GC). An active method for a thread being executed is recorded in the current context of the thread (a copy of a CPU resource, such as a program counter and a stack pointer), or in a JITed code frame that is held in the thread stack. If the JITed code for an active method is discarded, the relevant thread can not be executed. Therefore, only non-active JITed code is to be discarded. Since all the methods for which JITed code is provided are managed, only the JITed code for non-active methods is discarded, while active methods are maintained.

A method for finding active methods, i.e., a method for finding JITed frames in a thread stack, will now be focused on. As shown in FIG. 2, JITed frames and other frames coexist in a thread stack.

Although the efficiency of search for JITed frames is low, a conservative garbage collection method (hereinafter referred to as a conservative GC method) can be employed while no overhead is imposed on the performance of JITed code (see FIG. 3). Specifically, all the effective areas in the thread stack are scanned, and all the values held in the thread stack are examined to determine whether they are addresses of JITed codes belonging to a specific method. If the addresses are of JITed code for a specific method, the method is regarded as active. If a JITed frame, including a pointer to JITed code, is present in the thread stack, the conservative GC method can find it. However, the conservative GC method has certain shortcomings: false JITed code addresses are extracted, and the discovery efficiency is low. Since all values in a stack are examined when the conservative GC method is used, if a JITed code address is unexpectedly included in the stack, it will mistakenly be identified as a real JITed code address. This gives rise to the shortcoming concerning false JITed code addresses. The reason the discovery efficiency is low will become apparent from the following. During the actual application of a program, the stack area tends to be large, and very many values, which are held in the thread stack, must be examined to determine whether it is the JITed code address of a specific method. In addition, the cost involved in obtaining a corresponding method from arbitrary values that are examined by scanning is high. Even if JITed codes are sorted according to the addresses in memory to which the JITed codes are assigned, the cost of extracting a method from JITed code addresses which are of several thousand, or of several tens of thousands, of JITed codes that are dynamically generated (or erased) will be very high. In addition to this, the period during which a program is halted due to the compiling process performed by a JIT compiler must be shortened as much as possible.

SUMMARY OF THE INVENTION

It is one object of the present invention to detect only JITed frames in an environment, in which the memory available to a JIT compiler is limited, and a JITed frame is optimized so that it is as good as an optimized code frame by a C compiler, and the JITed frames and other frames coexist in a thread stack.

It is an additional object of the present invention to detect JITed frames and to find an active method.

It is another object of the present invention to efficiently and rapidly detect only JITed frames.

It is a further object of the present invention to detect a code for a method that can be discarded.

The most efficient method from a viewpoint of the discovery efficiency is a method by which only JITed frames are managed (hereinafter referred to as a JITed last frame method) (see FIG. 4). A square in FIG. 4 (hereinafter referred to as a JITed last frame record) manages sequential JITed frames, and itself constitutes a list. The JITed last frame record is generated each time the JITed code calls non-JITed code, such as a service routine, and the list is updated. The JITed last frame method has two shortcomings: the possibility that a JITed frame will not be found, and the deterioration of the performance of the JITed code. The failure of discover of a JITed frame occurs in the following case. The JIT compiler performs the mapping of an exception in Java to an exception in CPU, if possible, in order to improve the performance. In the mapped system, assume that (1) a CPU exception (Java exception) occurs, (2) an exception handler is being executed, and (3) due to the shortage of memory the JIT compiler initiates the JIT code GC method for another thread. In this case, the latest JITed last frame record (black square in FIG. 4) is not formed in a thread that causes the exception even though a code other than JITed code is executed. Therefore, a JITed frame discovery failure occurs (JITed frames for methods C and D in FIG. 4). Further, since a JITed last frame record is generated each time JITed code calls non-JITed code, deterioration of the performance of the JITed code also occurs. For these reasons, a simple JITed last frame method can not be employed for a system in which a Java exception is mapped to a CPU exception and another thread during exception processing is operating, or a system in which emphasis is placed on performance.

Therefore, a hybrid method is employed with which the conservative GC method is combined, as needed, while the JITed last frame method is employed as a basis. With this method, the two shortcomings of the JITed last frame method, the failure of discovery of JITed frame and the deterioration of the performance, can be resolved, and reduction in the discovery efficiency is minimized by employing the conservative GC method specifically.

First, the JIT compiler detects a JITed code exit point to constitute a JITed last frame record. Basically, this point does not include non-JITed code calling that is to be frequently executed, but includes non-JITed code calling that is to be executed only once.

The JITed last frame record points at a frame of a JITed code that calls non-JITed code, and also points at a JITed last frame record that is formed last. These records constitute an LIFO (Last in First Out) list (see FIG. 5). In FIG. 5, a square represents a JITed last frame record, and a black square represents a JITed last frame record that is generated before the method D calls non-JITed code. The JITed last frame records and the LIFO list are managed for each thread.

The JIT code GC method is performed in the following manner. When the JIT compiler runs in short of memory in a specific thread, all the threads are temporarily suspended. Then, for each thread active methods are searched for, i.e., JITed code addresses in each thread stack are searched for. When there is no LIFO list of JITed last frame records, the conservative GC method is performed from a position pointed by the current stack pointer SP (obtained from a current context) up to the bottom of the stack. When there is a LIFO list, the conservative GC method is performed from a position pointed by the current stack pointer SP up to the address of a JITed frame pointed by the latest JITed last frame record in the list. Following this, the JITed last frame method is performed. These two methods may be performed in the inverted order. FIG. 6 is a specific diagram showing this process. In FIG. 6, a stack area upper than the JITed frame of JITed code E (an area from SP to a frame with label E added) is a frame of non-JITed code called from a point at which it is determined that a JITed last frame record will not be formed, or a frame for an exception handler that handles Java exception mapped to a CPU exception. When all active methods are found, methods whose JITed code can be discarded are selected from the remaining methods by referring to execution profile information. A histogram of total call counts is, for example, employed to select methods that have smaller calling counts. When as the result of discarding the JIT compiler obtains a free memory capacity larger than currently being requested, or when all the removable methods are discarded, the JIT code GC process is completed. Before completing the process, a fragmented area may be formed compact (memory blocks are moved and linked together so as to be as continuous as possible).

According to the present invention, the conservative GC method is partially performed to permit non-JITed code calling for which a JITed last frame record is not generated, and to prevent a failure to find an active method that is caused by the permission. In a system in which the memory capacity available for the JIT compiler is strictly limited and the memory tends to be insufficient, as many JITed last records as possible are formed to improve the efficiency of the JIT code GC process. On the other hand, in a system in which virtual memory is supported and the memory capacity is not so strictly limited, not many JITed last records are formed in which emphasis is placed on the performance of JITed code. As described above, according to the present invention, the frequency of the generation of JITed last records is changed in accordance with trade-offs between the memory requested and the execution performance. Therefore, compared with the discovery of an active method using only the conservative GC method, a system that is effective (as regards false JITed code) and efficient (as regards small scanning areas) can be provided.

A summary of the present invention will now be given. A JIT compiler according to the present invention performs the following processing, that is, following steps are included: if it is detected that a first routine has called a second routine, determining whether the second routine satisfies a predetermined condition; and if the second routine satisfies the predetermined condition, generating in codes for the first routine, a code for generating a record (JITed last frame record in the preferred embodiment) that points at a stack frame of the first routine. As a result, it is easy to detect the stack frame of a routine that satisfies a predetermined condition. Such a predetermined condition may be set by a trade-off effected between the efficiency in the detection of a stack frame and a load imposed by the generation of a record. The record may include a pointer that points at a record that was formed immediately before the record which is first mentioned.

The predetermined condition may be that a routine is not compiled by the compiler. Further, the predetermined condition may be either that a routine is not compiled by the compiler and has a property such that a frequency of the second routine being called is less than or equal to a predetermined value, and such that the generation of the record does not lower the entire performance more than a predetermined level, or that a routine is not compiled by the compiler and may call a routine that is to be compiled by the compiler. Here, what is meant by "a routine that may call a routine that is to be compiled by the compiler" is that the routine to be compiled may generate the above described record.

The compile method further comprises steps of: generating, in the codes for the first routine, a code for calling the second routine; and generating a code for deleting a record after the code for calling the second routine.

Garbage collection according to the present invention includes the following processing, that is, in a system which stores, in a stack, stack frames of routines that are executed or being executed if a record (e.g., a JITed last frame record in the preferred embodiment) that points at a stack frame corresponding to a routine that satisfies a predetermined condition and that has been complied by a predetermined compiler (a JIT compiler in the preferred embodiment), following steps are executed to detect a stack frame of a routine compiled by the predetermined compiler: scanning the stack from a stack pointer to a stack frame (the latest record in the preferred embodiment; however, the scanning is not limited to this record) pointed by the record, and detecting a stack frame of a routine that has been compiled by the predetermined compiler; and detecting the stack frame pointed by the record and a stack frame of a routine that has been compiled by the predetermined compiler and that can be sequentially traced from the stack frame pointed at by the record. As a result, the stack frames of all the routines that have been compiled by the predetermined compiler can be detected. The above two steps may be performed in inverted order.

The condition described in the previous paragraph can be employed as the predetermined condition.

Garbage collection according to the present invention may perform the following processing, that is, following steps are executed: determining whether a stack pointer points at a stack frame of a routine that has been compiled by a predetermined compiler; if the stack pointer points at the stack frame of the routine compiled by the predetermined compiler, detecting the stack frame pointed by the stack pointer and a stack frame of a routine that has been compiled by the predetermined compiler and that can be sequentially traced from the stack frame pointed by the stack pointer; and detecting a stack frame pointed by a record and a stack frame of a routine that has been compiled by the predetermined compiler and that can be sequentially traced from the stack frame pointed at by the record. This processing utilizes a property whereby when a stack pointer points at the stack frame of a routine that has been compiled by the predetermined compiler, a stack frame to be detected is not present between the oldest stack frame of the routine that has been compiled by the predetermined compiler and that can be sequentially traced from the stack frame pointed by the stack pointer and the frame pointed by the record.

The above processing further comprises a step of, if the stack pointer does not point at the stack frame of the routine compiled by the predetermined compiler, tracing the stack from the stack pointer to the stack frame pointed by the record, and detecting the stack frame of a routine compiled by the predetermined compiler.

The code for a routine that can be discarded is a code for a routine other than the routine of the stack frames detected as described above. If it is possible to discard, the code for the routine is discarded. The processing for detecting a code for a routine compiled by the predetermined compiler is executed in response that, during the compile by the predetermined compiler, it happens that insufficient memory is available.

The processing performed according to the present invention has been explained. The present invention can be implemented by an apparatus that performs the above processing or by a program that causes a computer to perform the processing. For one having ordinary skill in the art it would be easy to store this program on a memory medium, such as a floppy disk or a CD-ROM, or in another type of storage device.

PREFERRED EMBODIMENT

Figure 1:
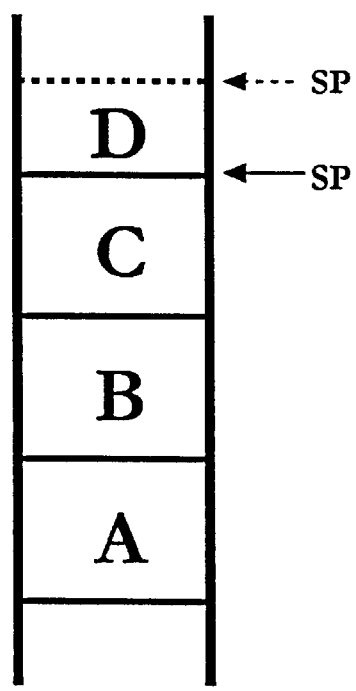
FIG. 1 is a diagram for explaining an example stack frame.
Figure 2:
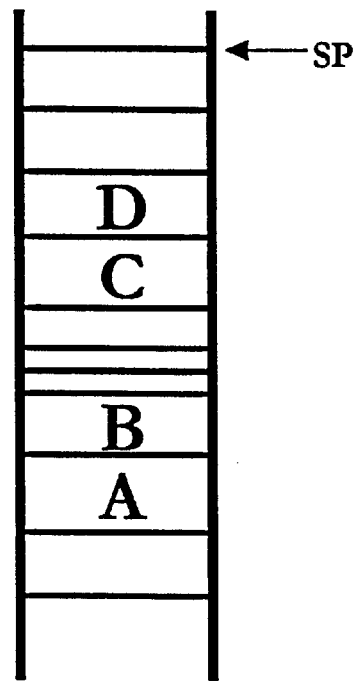
FIG. 2 is a diagram for explaining an example stack frame.
Figure 3:
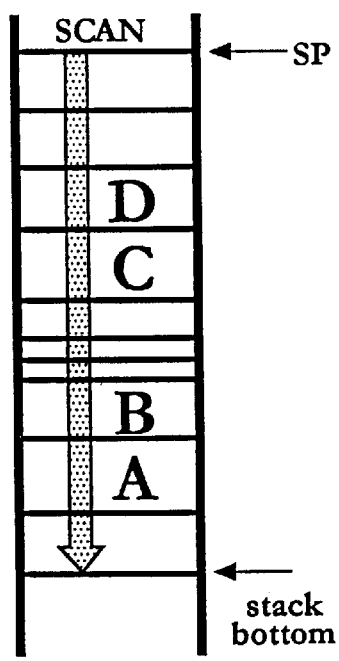
FIG. 3 is a diagram for explaining a conservative garbage collection method.
Figure 4:
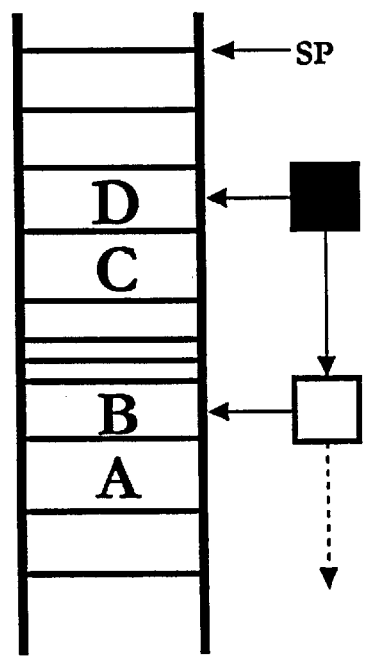
FIG. 4 is a diagram for explaining a JITed frame record GC method.
Figure 5:
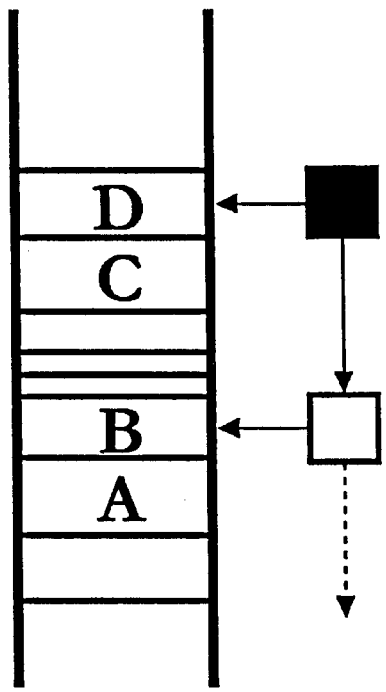
FIG. 5 is a diagram for explaining the JITed frame record GC method.
Figure 6:
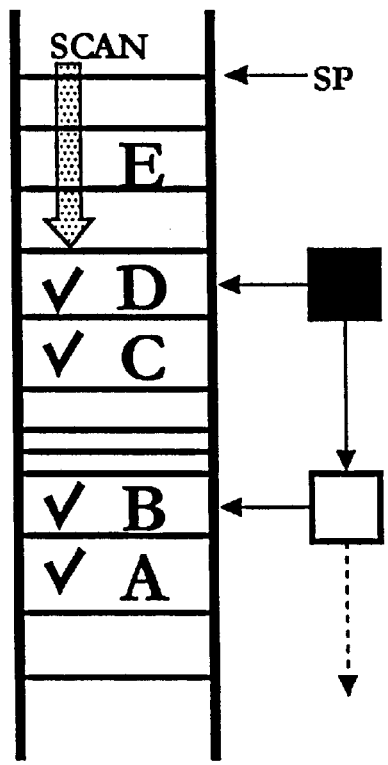
FIG. 6 is a diagram for explaining the detection of a frame that corresponds to JITed code according to the present invention.
Figure 7:
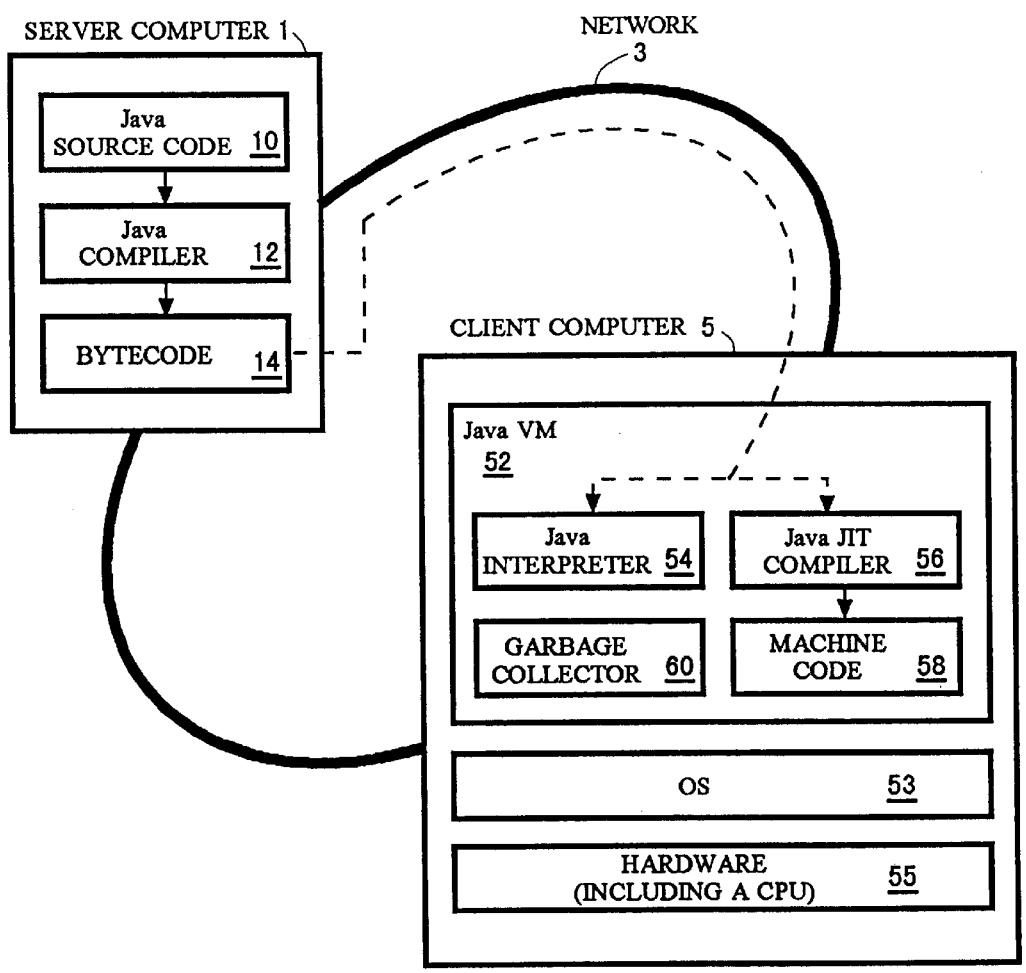
FIG. 7 is a diagram showing an example configuration according to the present invention.

A device configuration of the present invention will now be described referring to FIG. 7. A server computer 1 and a client computer 5 are interconnected across a network 3. The client computer 5 comprises a Java VM (Virtual Machine) 52, an OS (Operating System) 53 and hardware components (including a CPU and a memory) 55. The Java VM 52 includes a Java interpreter 54 or a Java JIT compiler 56, and a garbage collector 60 that performs garbage collection. The Java VM 52 may include both the interpreter 54 and the JIT compiler 56. The client computer 5 may be either a so-called network computer, or an information home appliance that do not include a sub-storage device such as a hard disk, in addition to an ordinary computer.

In the server computer 1, Java source code 10 is compiled by a Java compiler 12, and then bytecode 14 is obtained as the result of a compiling process. The bytecode 14 is transmitted across the network 3 to the client computer 5. The bytecode 14 is a native code for the Java VM 52 that is provided for a WWW (World Wide Web) browser in the client computer 5. To execute the bytecode 14 in the hardware component 55, such as a CPU, the Java interpreter 54 or the Java JIT compiler 56 is employed. The interpreter 54 decodes the bytecode 14 before execution, and calls a process routine that is prepared for each command. The JIT compiler 56 converts the bytecode 14 into machine code 58 in advance or immediately before its execution, and the CPU executes the obtained machine code 58.

A portion associated with the present invention in the JIT compiler 56, and the garbage collector 60 will now be described.

(1) A Portion Associated with the Present Invention in the JIT Compiler 56

Figure 8:
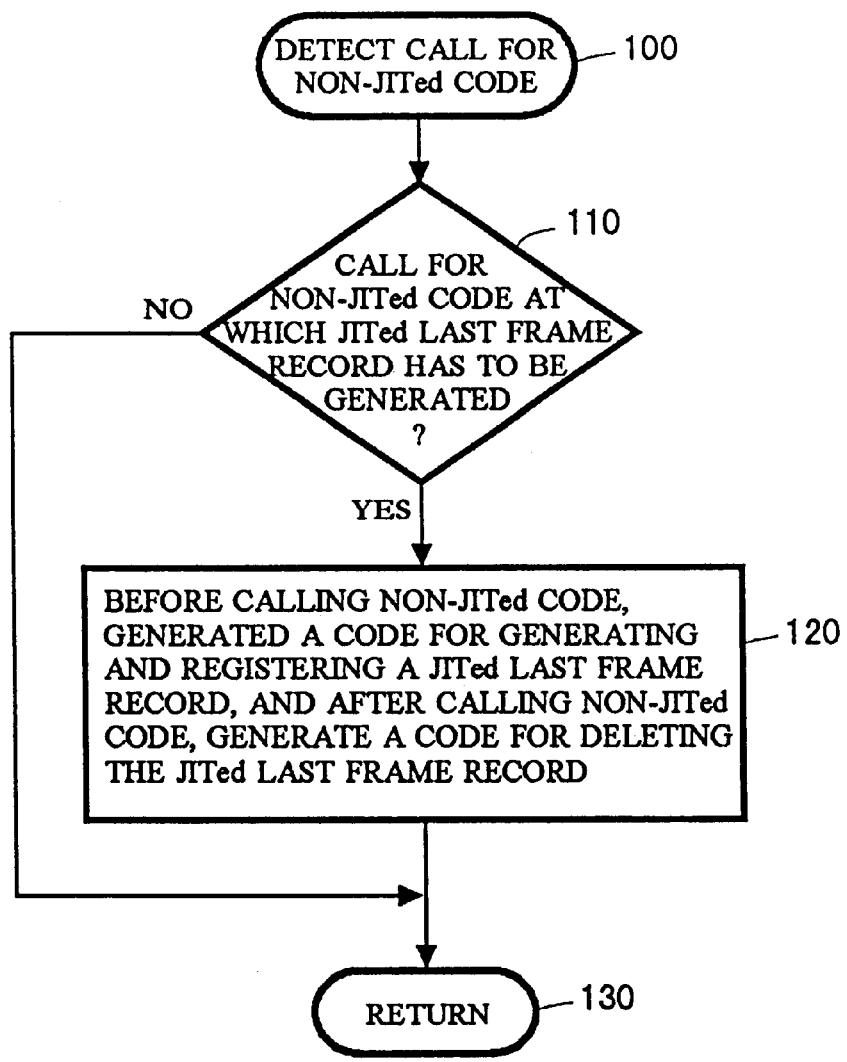
FIG. 8 is a flowchart showing example processing performed by a JIT compiler 56.

A portion associated with the present invention in the JIT compiler 56 will now be described referring to FIG. 8.

When JITed code is generated, there is a case where a code which calls non-JITed code is generated. When the JIT compiler 56 detects the calling of non-JITed code (step 100), the JIT compiler 56 sorts individual non-JITed code calls based on defined rules, and determines whether these calls are ones for the generation of a JITed last frame record (step 110). The sorting depends on whether a Java method (more specifically, JITed code that constitutes a JITed last frame record) is to be called directly or indirectly by a non-JITed code. This is done because if a JITed last frame record is not generated, a detection failure may occur in the active method detection process, which will be described later.

A problem arises as to whether it is possible to detect that a non-JITed code calls a Java method directly or indirectly. The principle of Java programming is "Once a program is written, it will run anywhere," so that specifically, for the system shown in FIG. 7, all programs other than a system program are written in Java. In other words, a program not written in Java is a system program, and its behavior is well known to the system. Non-JITed codes directly called by JITed code are roughly sorted into (1) a service routine of the Java VM 52; (2) glue code for a native method; and (3) glue code for a Java method that has not been complied by a JIT compiler. Since these are all system programs, how each of them behaves is well known to the system, and whether these codes call Java methods directly or indirectly is also known.

Generally, the calling of a Java method by non-JITed code is essentially the same as that the Java VM 52 is newly activated, and the cost imposed for a call by non-JITed code is high. Therefore, it is predicted that such calling by non-JITed code will occur less frequently. Even if a JITed last frame record is formed for such calling by non-JITed code, it has little effect on the execution performance.

Assume a case of the code generation for a Java synchronized method. In this case, service routines are called to lock an object in prologue of generated JITed code and to unlock in epilogue code. For the performance reason, it is preferable that the overhead of the generation, registration and deletion of a JITed last frame not be added to the overhead of the locking and unlocking of a synchronized method. Therefore, in accordance with a rule that a JITed last frame record should not be constituted when service routines of the locking/unlocking of a synchronized method are called, non-JITed code is called without a JITed last frame record being prepared, thereby preventing the deterioration of the execution performance. For the service routine of locking/unlocking of a synchronized method, the rule that "non-JITed code that is a callee is non-JITed code that is called less frequently and that does not cause deterioration of the performance by generating a JITed last frame record" was applied at step 110.

If at step 110 it is determined that the JITed last frame record has to be generated, a code for generating and registering a JITed last frame record is generated before calling non-JITed code, and a code for deleting the JITed last frame record is generated after calling non-JITed code (step 120). The obtained JITed last frame record points at a JITed frame of a JITed method that is a caller. At the same time, the JITed last frame record constitutes an LIFO list. That is, a pointer to the previous JITed last frame record is also included. The LIFO list is inherent to each thread, and is stored and managed in a main memory by a thread control block.

(2) Operation of the Garbage Collector 60

Figure 9:
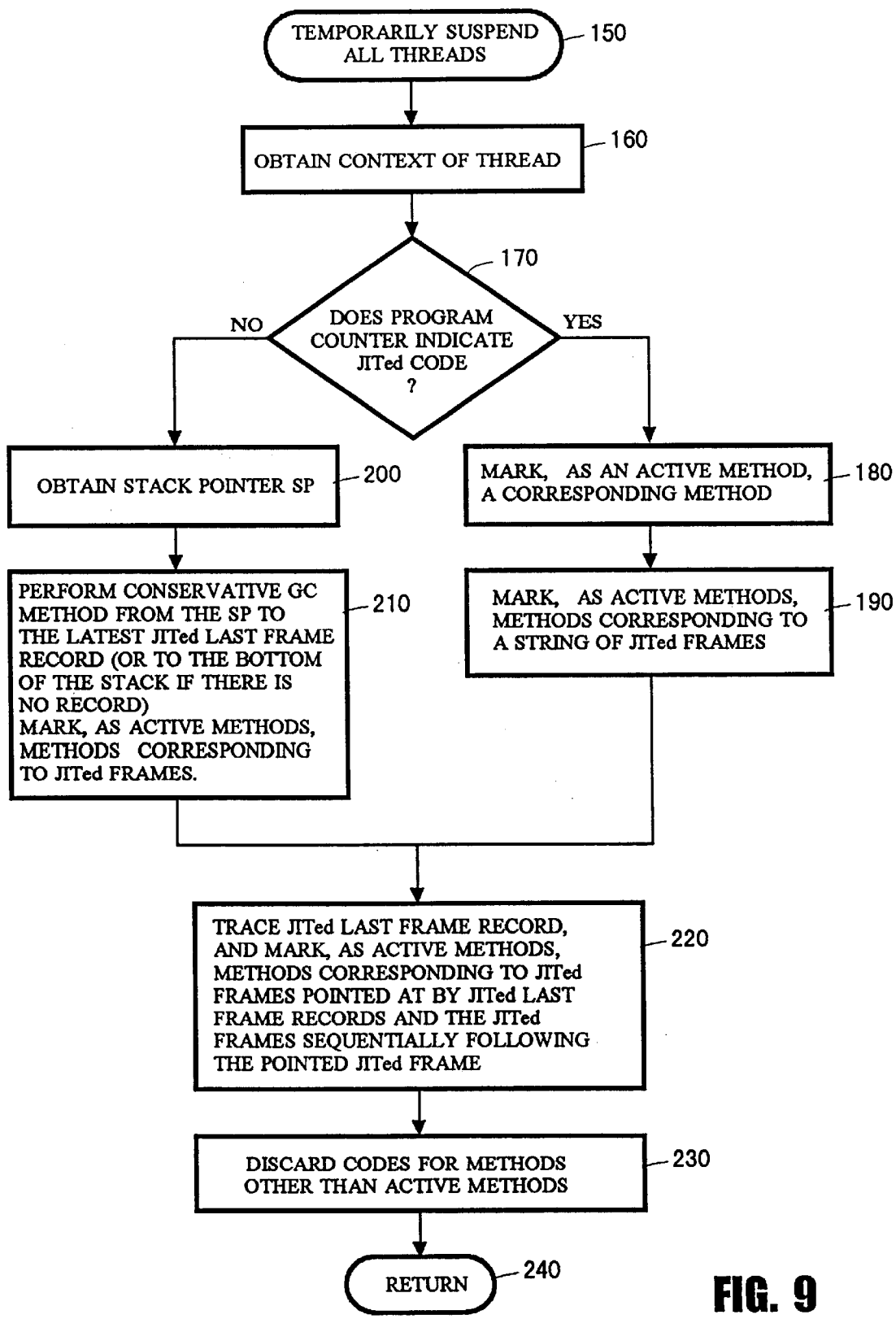
FIG. 9 is a flowchart showing example processing performed by a garbage collector 60.

When in a specific thread, a request for memory from the JIT compiler is not satisfied, the specific method temporarily suspends all the threads except for its own, and the operation for finding active methods is performed. The following processing (FIG. 9) is initiated for each one of the threads.

First, the context of a thread is obtained in order to examine the current code (step 160). A program counter for the code that was executed when the threads were temporarily halted is obtained. If the counter points at JITed code (step 170), for a corresponding method a mark is provided that indicates it is an active method (step 180). Furthermore, corresponding methods of a JITed frame string following the JITed frame are marked as active methods. In other words, by obtaining JITed code addresses from frames of JITed codes which calls the active methods, corresponding methods of JITed frames are marked as active methods. The marks are stored in the main memory.

If at step 170 the context indicates non-JITed code, a stack pointer SP is obtained from the context (step 200). In an area extending from an address pointed by the SP and to a JITed frame indicated by the latest JITed last frame record in the LIFO list of the JITed last frames, the values for individual words are examined to determine whether they are JITed codes (step 210). That is, a partial conservative GC method is performed. When there is no LIFO list, the search is performed in the same manner in an area extending from the address pointed at by the stack pointer SP to the bottom of the stack. If JITed code is found, for a corresponding method a mark is provided that indicates it is an active method.

Following either step 210 or 190, the LIFO list of JITed last frame records is traced in accordance with the JITed last frame record method, and JITed code addresses are obtained from a string of JITed frames (a JITed frame directly designated and the JITed frames following it) that is pointed at by the individual JITed last frame record. Then, for methods corresponding to the JITed codes marks are provided that indicates they are active methods (step 220).

Optionally, the following process may be performed.

For a system wherein JITed code is indirectly called by a register, the values of all the registers that might be used for indirect calling are obtained from the context. AU the values are examined to determine whether they indicate JITed code. When a value indicates JITed code, for a corresponding method a mark is provided that indicates it is an active method.

Through the above processing, all the active methods for a specific thread can be marked.

A code for methods other than those marked are regarded as a code to be discarded. All or part of such codes can be discarded (step 230).

Figure 10:
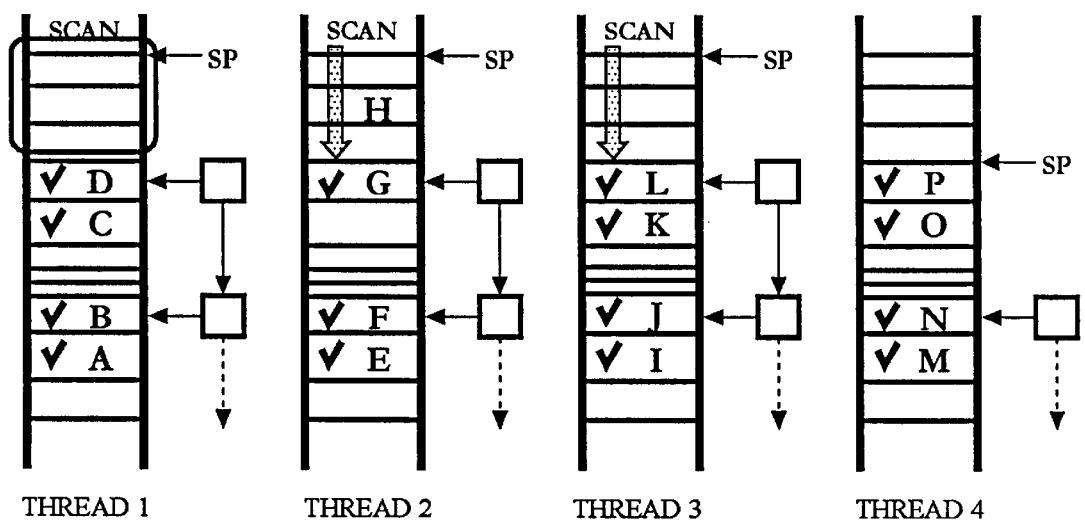
FIG. 10 is a diagram for explaining a specific example according to the present invention.

FIG. 10 shows thread stacks for four threads. Each thread stack is divided into frames. Frames that are identified by alphabetical characters are JITed frames; frame A, for example, is a JITed code frame for a method A. In this example, assume that during the operation of a JIT compiler for thread 1 it is determined that there is a shortage of memory, and that at that moment there are 26 JITed codes of method A to method Z. Frames enclosed by a rounded-corner rectangle in thread 1 are frames of a JIT compiler. In this example, when a JIT compiler is activated, a JITed last frame is formed.

The JIT code GC method using the present invention is performed as follows. First, thread 1 temporarily suspends threads 2 to 4. Thread 2 called non-JITed code without forming a JITed last frame record and is temporarily suspended in that code, thread 3 formed a JITed last frame record and called non-JITed code and is temporarily suspended in that code, and thread 4 is temporarily suspended during the execution of the JITed code.

Following this, JITed frames are searched for in threads 1 through 4 by using the current code check, the partial conservative GC method, and the JITed last frame method. In this example, the partial conservative GC method need not be performed for thread L. This is because the JITed last frame record is added to a frame before a frame of a JIT compiler. By using current code checking, in thread 4 JITed frames of methods O and P are found, and by using the partial conservative GC method a JITed frame of method H is found in thread 2. Further, by using the JITed last frame method, JITed frames of methods A to D are found in thread 1; JITed frames of methods E to G are found in thread 2; JITed frames of methods I to L are found in thread 3; and JITed frames of methods M and N are found in thread 4. As a result, 16 JITed frames are found in the thread stack that is currently in use, and marks are provided for the corresponding methods A to P to identify them as active methods.

Methods Q to Z, to which marks are not added, are non-active methods. Therefore, JITed codes for an arbitrary methods selected from among them may be discarded. In this example, the JITed codes for all the non-active methods are discarded. Since some JITed codes remain, in the memory the JITed codes for the active methods are fragmented. Thus, compaction is performed to reduce the fragmentation, and as much free continuous memory is obtained as is possible. Since the performance of the compaction process unconditionally extends the period required for the JIT-code GC method, this may be performed with a delay when a shortage of memory again occurs, as will be described later.

Finally, thread 1 permits the execution by threads 2 to 4, which were temporarily suspended, to be resumed, following which thread 1 again issues a request for the allocation of memory. If a sufficient amount of free memory can be obtained by using the JIT code GC method, the allocation of memory is successful, and compiling is sequentially performed.

A shortage of memory may again occur because a JIT compiler running in another thread obtained memory, or because insufficient free memory was obtained by discarding JITed code. If this occurs, in this embodiment the JIT code GC method is again performed. Generally, the JIT code GC process can be repeated n times. Thereafter, if the available memory is still insufficient, the current compiling session is halted.

Following this, the optimal level is lowered by one, in order to reduce the amount of memory consumed by the JIT compiler, and the compiling process is again initiated. This procedure is repeated until the compiling process can be performed successfully. If the compiling process can not be performed successfully at the lowest optimal level, the method is not compiled. When re-compiling is not permitted, the compiling of the method is also terminated.

ADVANTAGES OF THE INVENTION

According to the present invention, only JITed frames can be detected in an environment in which the memory used by a JIT compiler is limited, and a JITed frame is optimized so that it is as good as a frame of optimal code for a C compiler, and JITed frames and other frames coexist in a thread stack.

JITed frames can be detected and an active method can be found.

Only JITed frames can be detected efficiently and fast.

Codes for methods that can be discarded can be detected.

What is claimed is:

1. A compile method executed by a compiler, said method comprising the steps of:
   when a first routine has called a second routine, determining whether said second routine satisfies a predetermined condition; and
   if said second routine satisfies said predetermined condition, generating in codes for said first routine, a code for generating a JITed last frame record that points at a stack frame of said first routine.

2. The compile method according to claim 1, wherein a first record includes a pointer that points at a second record that was generated immediately before said first record.

3. The compile method according to claim 1, wherein said predetermined condition is a routine that is not compiled by said compiler.

4. The compile method according to claim 1, wherein said predetermined condition is a routine that is not compiled by said compiler and that calls a routine that is to be compiled by said compiler.

5. The compile method according to claim 1, further comprising steps of:
   generating, in said codes for said first routine, a code for calling said second routine; and
   generating a code for deleting said record after said code for calling said second routine.

6. A compile method executed by a compiler, said method comprising:
   when a first routine has called a second routine, determining whether said second routine satisfies a predetermined condition; and
   if said second routine satisfies said predetermined condition, generating in codes for said first routine, a code for generating a record that points at a stack frame of said first routine
   wherein said predetermined condition is a routine that is not compiled by said compiler and wherein said predetermined condition has a property such that a frequency of said second routine being called is less than or equal to a predetermined value, and such that the generation of said record does not lower the entire performance more than a predetermined level.

7. A method for detecting a stack frame of a routine compiled by a predetermined compiler in a system that stores, in a stack, stack frames of routines that are executed or being executed if a record that points at a stack frame corresponding to a routine that satisfies a predetermined condition and that has been complied by said predetermined compiler is stored, said method comprising the steps of:

detecting a stack frame pointed by said record and a stack frame of a routine that has been compiled by said predetermined compiler and that can be sequentially traced from said stack frame pointed by said record; and scanning said stack from a stack pointer to a stack frame pointed at by said record, and detecting a stack frame of a routine that has been compiled by said predetermined compiler.

8. The method according to claim 7, wherein said predetermined condition is a routine that is not compiled by said predetermined compiler.

9. A method for detecting a stack frame of a routine compiled by a predetermined compiler in a system that stores, in a stack, stack frames of routines that are executed or being executed if a record that identifies a stack frame corresponding to a routine that satisfies a predetermined condition and that has been complied by said predetermined compiler is stored, said method comprising the steps of:

determining whether a stack pointer points at a stack frame of a routine that has been compiled by said predetermined compiler;

if said stack pointer points at a stack frame of a routine that has been compiled by said predetermined compiler, detecting a stack frame pointed by said stack pointer and a stack frame of a routine that has been compiled by said predetermined compiler and that can be sequentially traced from said stack frame pointed by said stack pointer; and detecting a stack frame pointed by said record and a stack frame of a routine that has been compiled by said predetermined compiler and that can be sequentially traced from said stack frame pointed by said record.

10. The method according to claim 9, further comprising a step of, if said stack pointer does not point at a stack frame of a routine that has been compiled by said predetermined compiler, scanning said stack from said stack pointer to a stack frame pointed by said record, and detecting the stack frame of a routine that has been compiled by said predetermined compiler.

11. A method for discarding a code for a routine that can be discarded in a system that stores, in a stack, stack frames of routines that are executed or being executed if a record that points at a stack frame corresponding to a routine that satisfies a predetermined condition and that has been complied by a predetermined compiler is detected, said method comprising the steps of:

scanning said stack from a stack pointer to a stack frame pointed by said record, and detecting a stack frame of a routine that has been compiled by said predetermined compiler;

detecting said stack frame pointed at by said record and a stack frame of a routine that has been compiled by said predetermined compiler and that can be sequentially traced from said stack frame pointed by said record; and discarding codes for routines other than routines of the detected stack frames.

12. The method according to claim 11, wherein said scanning and detecting step and the subsequent steps are executed in response that, during the compile by said predetermined compiler, it happens that insufficient memory is available.

13. A computer having a compiler, said compiler comprising the steps of:

if it is detected that a first routine has called a second routine, determining whether said second routine satisfies a predetermined condition; and if said second routine satisfies said predetermined condition, generating in codes for said first routine, a code for generating a JITed last frame record that points at a stack frame of said first routine.

14. A computer for discarding a code for a routine that can be discarded in a system that stores, in a stack, stack frames of routines that are executed or being executed if a record that points at a stack frame corresponding to a routine that satisfies a predetermined condition and that has been complied by a predetermined compiler is stored, said computer comprising:

means for scanning said stack from a stack pointer to a stack frame pointed by said record, and for detecting a stack frame of a routine that has been compiled by said predetermined compiler;

means for detecting said stack frame pointed by said record and a stack frame of a routine that has been compiled by said predetermined compiler and that can be sequentially traced from said stack frame pointed at by said record; and means for discarding a code for a routine other than routines of the detected stack frames.

15. A storage medium for storing a compiler, said compiler comprising the steps of:

if it is detected that a first routine has called a second routine, determining whether said second routine satisfies a predetermined condition; and if said second routine satisfies said predetermined condition, generating in codes for said first routine, a code for generating a JITed last frame record that points at a stack frame of said first routine.

16. A storage medium for storing a program for causing a computer to detect a stack frame of a routine compiled by a predetermined compiler in a system that stores, in a stack, stack frames of routines that are executed or being executed if a record that identifies a stack frame corresponding to a routine that satisfies a predetermined condition and that has been complied by said predetermined compiler is stored, said program comprising the steps of:

scanning said stack from a stack pointer to a stack frame pointed by said record, and detecting a stack frame of a routine that has been compiled by said predetermined compiler; and detecting said stack frame pointed by said record and a stack frame of a routine that has been compiled by said predetermined compiler and that can be sequentially traced from said stack frame pointed by said record.

17. A storage medium for storing a program for causing a computer to detect a stack frame of a routine compiled by a predetermined compiler in a system that stores, in a stack, stack frames of routines that are executed or being executed, if a record that identifies a stack frame corresponding to a routine that satisfies a predetermined condition and that has been complied by said predetermined compiler is stored, said program comprising the steps of:

determining whether a stack pointer points at a stack frame of a routine that has been compiled by a predetermined compiler;

if said stack pointer points at said stack frame of said routine compiled by said predetermined compiler, detecting said stack frame pointed by said stack pointer and a stack frame of a routine that has been compiled by said predetermined compiler and that can be sequentially traced from said stack frame pointed at by said stack pointer; and detecting a stack frame pointed by a record and a stack frame of a routine that has been compiled by said predetermined compiler and that can be sequentially traced from said stack frame pointed at by said record.

18. A storage medium for storing a program for causing a computer to discard a code for a routine that can be discarded in a system that stores, in a stack, stack frames of routines that are executed or being executed, if a record that points at a stack frame corresponding to a routine that satisfies a predetermined condition and that has been complied by a predetermined compiler is stored, said program comprising the steps of:

scanning said stack from a stack pointer to a stack frame pointed by said record, and detecting a stack frame of a routine that has been compiled by said predetermined compiler;

detecting said stack frame pointed by said record and a stack frame of a routine that has been compiled by said predetermined compiler and that can be sequentially traced from said stack frame pointed at by said record; and discarding a code for a routine other than routines of the detected stack frames.

* * * * *